US006997607B2

(12) United States Patent
Iwaya et al.

(10) Patent No.: US 6,997,607 B2
(45) Date of Patent: Feb. 14, 2006

(54) TEMPERATURE SENSOR

(75) Inventors: Masaki Iwaya, Gifu (JP); Masahiko Nishi, Aichi (JP); Takaaki Chosokabe, Aichi (JP); Masaru Hayakawa, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 10/301,728

(22) Filed: Nov. 22, 2002

(65) Prior Publication Data

US 2004/0101028 A1 May 27, 2004

(51) Int. Cl.
*G01K 1/08* (2006.01)
*G01K 1/16* (2006.01)

(52) U.S. Cl. ...................... 374/208; 374/144; 374/163; 338/28

(58) Field of Classification Search ................ 374/163, 374/208, 185, 141, 142, 144, 147, 148, 183; 338/22 R, 25, 28
See application file for complete search history.

(56) References Cited

U.S. PATENT DOCUMENTS 2,815,663 A * 12/1957 Lupfer ........................ 374/208
4,491,680 A * 1/1985 Manecke .................... 136/230
4,707,148 A * 11/1987 Richmond .................. 374/208
5,022,766 A * 6/1991 Phipps ....................... 374/209
5,601,365 A * 2/1997 Li ............................. 374/121
5,632,557 A * 5/1997 Simons ...................... 374/148
5,743,646 A * 4/1998 O'Connell et al. ......... 374/148
6,059,453 A * 5/2000 Kempf et al. ............... 374/179
6,089,110 A * 7/2000 Pallotta et al. ............. 73/866.5
6,286,995 B1 * 9/2001 Takahashi et al. .......... 374/148
6,305,841 B1 * 10/2001 Fukaya et al. .............. 374/185
6,457,857 B1 * 10/2002 Gul ............................ 374/208
6,592,253 B2 * 7/2003 Nyffenegger et al. ....... 374/143
6,599,012 B2 * 7/2003 Gul ............................ 374/208
6,698,922 B2 * 3/2004 Adachi et al. .............. 374/208
2001/0002201 A1 * 5/2001 Kita et al. .................. 374/140
2002/0039378 A1 * 4/2002 Shibayama ................. 374/148
2002/0061049 A1 * 5/2002 Adacjo et al. .............. 374/208
2002/0085617 A1 * 7/2002 Gui ............................ 374/208
2002/0131477 A1 * 9/2002 Kurano ....................... 374/185
2002/0135455 A1 * 9/2002 Murata et al. ................ 338/28
2002/0136263 A1 * 9/2002 Wilkins ...................... 374/141
2002/0172259 A1 * 11/2002 Bach .......................... 374/208
2004/0135664 A1 * 7/2004 Hanzawa et al. ............. 338/25
2004/0212477 A1 * 10/2004 Shibayama .................. 338/25
2004/0218662 A1 * 11/2004 Hanzawa et al. ........... 374/185
2005/0175067 A1 * 8/2005 Chu ........................... 374/208

FOREIGN PATENT DOCUMENTS

JP 58-134745 9/1983

(Continued)

*Primary Examiner*—Gail Verbitsky
(74) *Attorney, Agent, or Firm*—Sughrue Mion, PLLC

(57) ABSTRACT

A cylindrical metal tube (3) accommodating therein a thermistor device (2), the electric characteristics of which change with temperature, is pushed into, or clamped and fixed to, a sheath portion (42) positioned on a flange (4) to the rear of a projection portion (41) of the flange (4), and is laser welded in a circumferential direction. A weld portion (L1) formed to bridge the metal tube (3) and the sheath portion (42) of the flange (4) firmly fixes the metal tube (3) to the flange (4). In the temperature sensor (1) having this construction, the weld portion (L1) between the metal tube (3) and the flange (4) is not exposed to a high temperature environment. Therefore, oxidation hardly occurs at the weld portion and reliability of air tightness to an exhaust gas can be improved.

10 Claims, 2 Drawing Sheets

FOREIGN PATENT DOCUMENTS

| | | |
|---|---|---|
| JP | 5-72049 | 3/1993 |
| JP | 5-340822 | 12/1993 |
| JP | 6-201487 | 7/1994 |
| JP | 2000-162051 | 6/2000 |

* cited by examiner

TEMPERATURE SENSOR

BACKGROUND OF THE INVENTION

1. Field of the Invention

This invention relates to a temperature sensor including a thermistor formed of a semiconductor such as a metal oxide or a metal resistor as a heat-sensitive device. More particularly, the invention relates to a temperature sensor that arranges a device inside a flow passage, through which a measured fluid (exhaust gas, for example) flows, inside a catalyst converter of an exhaust gas purification apparatus or inside an exhaust pipe of an automobile, and detects a temperature of the measured fluid.

2. Description of the Related Art

A known temperature sensor has a construction including a sheath member (sheath pin) with built-in metal core wires having a thermistor device as a temperature-sensitive device connected to a distal end side thereof and built-in lead wires for connecting an external circuit, connected on a rear end side thereof and a metal cap fitted to the sheath member while accommodating the thermistor device, wherein the sheath member is welded to a predetermined position of a flange (rib) (refer, for example, to Japanese Patent Laid-Open No. 162051/2000 (FIG. 1)). Such a temperature sensor is used as an exhaust gas temperature sensor for detecting a temperature of exhaust gas flowing inside an exhaust gas passage by the temperature-sensitive device.

3. Problems to be Solved by the Invention

The temperature sensor described in the above patent publication has a construction in which a sheath member is inserted into a flange and an end portion of the flange towards an exhaust gas passage (in other words, a distal end portion of the flange) is welded in an entire circumference by laser welding to fix the flange to the sheath member. In the temperature sensor having such a construction, however, the weld portion between the flange and the sheath member formed by laser welding is arranged inside the exhaust gas passage when an exhaust pipe is fitted, for example. Therefore, a problem of heat transfer to the flange from a heat-sensitive portion (portion on the side of a thermistor device arranged inside the exhaust pipe) through the weld portion develops inside the exhaust pipe. When heat transfer from the heat-sensitive portion to the flange becomes easier, the response and temperature-measuring accuracy of the heat-sensitive portion become deteriorated.

When a weld portion between metals is arranged in the exhaust gas passage, the weld portion is directly exposed to a high temperature environment and is oxidized. Consequently, durability of the sensor itself and air tightness of the exhaust gas are likely to be degraded in the course of use over a long term. To improve reliability of the temperature sensor, therefore, a construction is desired in which the number of weld portions of laser welding arranged inside the exhaust gas passage is as small as possible.

To solve the above problems of the prior art, on object of the present invention is to provide a temperature sensor having excellent durability, which is capable of suppressing heat transfer from a heat-sensitive portion to a flange, and having high reliability even when used under a high-temperature environment such as inside a catalyst converter of an automobile or inside an exhaust pipe.

The above object of the present invention has been achieved by providing a temperature sensor including a cylindrical metal tube having a distal end thereof closed and extending in an axial direction; a device accommodated in the metal tube and having electric characteristics thereof changing in accordance with temperature; and a flange arranged so as to encompass an outer peripheral surface of the metal tube; wherein the flange includes a sheath portion extending in the axial direction and a projection portion positioned on a distal end side of the sheath portion and protruding outward in a diametric direction, the metal tube is pushed into, or clamped and fixed to, at least the sheath portion, and the metal tube and the sheath portion are welded in a circumferential direction.

In the temperature sensor according to the invention, the metal tube and the flange are welded integrally with each other. This welding is made at the sheath portion positioned on the rear end side of the projection portion but not at a portion facing the inside of the flow passage through which the measured fluid flows, such as the exhaust gas passage inside the flange (more concretely, not on the distal end side of the projection portion). Therefore, when the temperature sensor is fitted to a flow passage tube through which the measured fluid flows, the weld portion for fixing the flange and the metal tube is not arranged inside the flow passage. In other words, the weld portion between the flange and the metal tube is disposed at a position at which the weld portion is not exposed to the measured fluid such as the exhaust gas. Consequently, a heat transfer path extending from the heat-sensitive portion to the flange through the weld portion is not formed. Furthermore, the degree of heat transfer from the heat-sensitive portion to the flange can be reduced much more than in the prior art sensors, and the effect of improving sensor response and preventing a reduction in temperature-measuring accuracy can be achieved. Furthermore, because the invention employs a construction in which the metal tube itself is welded and fixed to the sheath portion of the flange, the weld portion is not exposed to the measured fluid as described above, and reliability of air tightness to the measured fluid can be improved.

In the invention, the metal tube for accommodating the device and the sheath portion are welded in the circumferential direction while the metal tube is pushed into, or clamped and fixed to, at least the sheath portion of the flange. Therefore, welding strength is high, and adhesion strength between the flange and the metal tube is also high. The temperature sensor according to the invention has high durability even when used under a severe environment such as vibration of an automobile, and can further improve reliability of air tightness to the measured fluid.

When the temperature sensor is used for detecting the exhaust gas temperature of the automobile, it is used in a high-temperature environment of 200 to 1,000° C. Therefore, not only the outer surface of the metal tube but also its inner surface is oxidized and the oxygen concentration inside the space for accommodating the device remarkably drops. Consequently, the surface of the device is reduced with the result that the characteristics of the device change. This oxidation is likely to occur particularly on the outer and inner surfaces of the weld portion between the metal tube and the flange. When such a weld portion is formed on the distal end side of the flange facing the inside of the flow passage, the weld portion itself is exposed to the high-temperature environment and oxidation is further promoted. In the invention, on the other hand, the metal tube and the flange are welded not at the projection portion on the distal end side of the flange facing the inside of the flow passage but at the sheath portion positioned on the rear end side of the projection portion. Consequently, the occurrence of oxidation at the weld portion can be suppressed and the temperature sensor has high durability.

In the temperature sensor described above, the sheath portion constituting the flange has a two-step shape including a distal end step portion positioned on the distal end side and a rear end step portion having an outer diameter smaller than that of the distal end step portion. The metal tube may well be welded to the rear end step portion of the sheath portion.

To form the weld portion between the metal tube with the sheath portion of the flange with sufficient welding strength in the circumferential direction of the sheath portion, it may be conceivable to employ a method that sets the welding condition to a higher level, or to reduce the thickness of the sheath portion and to conduct welding without changing the welding condition. When the welding condition is merely increased, however, the cost will rise. When the thickness of the sheath portion is reduced as a whole, on the contrary, mechanical strength of the sheath portion itself will decrease. Therefore, the invention forms the sheath portion of the flange into a two-step shape having a distal end step portion and a rear end step portion having a smaller diameter than the distal end step portion, and welds the metal tube to the rear end step portion of the sheath portion. In other words, the thickness of the weld position of the sheath portion that is to be welded is small. In this way, the invention can satisfactorily weld the sheath portion and the metal tube, and can secure sufficient welding strength between them in addition to sufficient mechanical strength of the sheath portion and eventually, mechanical strength of the flange. Additionally, the diameter of the rear end side of the sheath portion is preferably smaller than that of the distal end side because machining becomes easier than when the rear end side has a greater diameter than the distal end side.

In any of the temperature sensors described above, welding between the metal tube and the sheath portion of the flange is not particularly limited. Exemplary welding technologies include laser welding, plasma welding, electron beam welding and argon welding.

Any of the temperature sensors described above preferably has a construction which further includes a sheath member having built-in metal core wires having the device connected to a distal end side thereof and built-in lead wires for connecting an external circuit, connected to a rear end side thereof, and a cylindrical joint bonded air-tight outside the sheath portion of the flange in the diametric direction and extending rearward in the axial direction, and wherein the distal end side of the sheath member is inserted into the metal tube, and the rear end side of the metal tube and the distal end side of the lead wires are arranged inside the joint.

In the temperature sensor according to the invention, the device accommodated in the metal tube and the lead wires for connecting the external circuit are connected to one another through the sheath member having the built-in metal core wires. Therefore, a step of separately packing insulating powder between the metal tube and the lead wires is not necessary and their electrical insulation can be reliably established. In the invention, while the distal end side of the sheath member is inserted into the metal tube, the rear end side of the metal tube is arranged inside the joint separately bonded to the rear end side of the flange, and the distal end side of the lead wires is arranged inside the joint. Therefore, the device is accommodated inside the closed space defined by the metal tube, the flange and the joint as the metal enclosure members while ventilation is secured by a ventilation path defined by the internal space of the lead wires, the internal space of the joint and the space between the outer peripheral surface on the distal end side of the sheath member and the inner peripheral surface of the metal tube.

Therefore, even when the inner surface of the metal tube is oxidized in the invention, a reduction in oxygen concentration inside the metal tube can be suppressed because ventilation is secured between the outside and the inside of the metal tube. Consequently, the change of characteristics of the device resulting from oxidation can be suppressed. Additionally, means for welding the joint and the flange are not particularly limited, and laser welding, plasma welding, electron beam welding, argon welding or brazing can be employed.

In the temperature sensor having the construction described above, the sheath portion has a two-step shape including a distal end step portion positioned on a distal end side and a rear end step portion having an outer diameter smaller than that of the distal end step portion, and the metal tube is welded to the rear end step portion of the sheath portion, and the joint is bonded to an outer peripheral surface of the distal end step portion in a circumferential direction.

As described above, when the sheath portion of the flange has a two-step shape including the distal end step portion and the rear end step portion having a smaller diameter than the distal end step portion and the metal tube is welded to the rear end step portion of the sheath portion, welding strength can be sufficiently secured between the sheath portion and the metal tube while mechanical strength of the flange can be secured. In the temperature sensor of the invention, the cylindrical joint is bonded to the outer peripheral surface of the distal end step portion of the flange. Therefore, the weld portion between the rear end step portion of the sheath portion of the flange and the metal tube is accommodated in the joint. Consequently, the joint plays the roles of preventing brine and moisture from adhering to the weld portion between the metal tube and the flange, and preventing the weld portion from being corroded by moisture or the like.

The present invention also provides a temperature sensor including a sheath member that includes built-in metal core wires having a device having electric characteristics thereof changing in accordance with temperature, the device being connected to a distal end side of the core wires, and built-in lead wires for connecting an external circuit, connected to a rear end side thereof; a cylindrical metal cap having a distal end thereof closed, extending in an axial direction and having an inner periphery on the rear end side thereof connected to an outer periphery on the distal end side of the sheath member in a circumferential direction while accommodating therein the device; and a flange so arranged as to encompass the outer periphery of the sheath member; wherein the flange includes a sheath portion extending in the axial direction and a projection portion positioned on the distal end side of the sheath portion and protruding outward in a diametric direction, the sheath member is pushed into, or clamped and fixed to, at least the sheath portion, and the sheath member and the sheath portion are welded in a circumferential direction.

In the temperature sensor according to the invention, the sheath member having the metal cap for accommodating the device bonded thereto is integrally welded to the flange. This welding is applied at the sheath portion positioned on the rear end side of the projection portion but not at a portion facing the inside of a flow passage through which a measured fluid flows, such as an exhaust gas passage inside the flange (more concretely, not on the distal end side of the projection portion). Therefore, when the temperature sensor is fitted to the flow passage through which the measured fluid flows, the weld portion for fixing the flange and the sheath member is not arranged inside the flow passage. In other words, the weld portion between the flange and the sheath member is disposed at the position at which it is not exposed to the measured fluid. As a result, a heat transfer path extending from the heat-sensitive portion to the flange through the weld portion is not formed inside the flow passage. Furthermore, the degree of heat transfer from the heat-sensitive portion to the flange can be reduced much more than in the prior art sensors, and the effect of improving sensor response and preventing a reduction in temperature measuring accuracy can be achieved. In comparison with temperature sensors having the prior art construction, the number of the weld portions between the metals that face inside the flow passage can be decreased. Consequently, the occurrence of oxidation at the weld portion can be suppressed and air tightness to the measured fluid can be improved.

In the invention, while the sheath member is pushed into, or clamped and fixed to, at least the sheath portion of the flange, the sheath member and the sheath portion are welded in the circumferential direction. Therefore, welding strength is high, and adhesion strength between the flange and the sheath member is also high. Even when used in an environment having vigorous vibration, the temperature sensor according to the invention exhibits high durability and can further improve reliability of air tightness to the measured fluid.

In the temperature sensor described above, the sheath portion constituting the flange has the two-step shape including the distal end step portion positioned on the distal end side and the rear end step portion having a smaller outer diameter than that of the distal end step portion, and the sheath member is preferably welded to the rear end step portion of the sheath portion.

To form the weld portion with sufficient welding strength between the sheath member and the sheath portion of the flange in the circumferential direction of the sheath portion, it may be possible to set the welding condition to a higher level, or to reduce the thickness of the sheath portion without changing the welding condition and to conduct welding. When the welding condition is merely increased, however, the cost will rise. When the thickness of the sheath portion is reduced as a whole, on the contrary, mechanical strength of the sheath portion itself is reduced. Therefore, the invention forms the sheath portion of the flange into the two-step shape having the distal end step portion and the rear end step portion having a smaller diameter than the distal end step portion, and welds the sheath member to the rear end step portion of the sheath portion. In this manner, the invention can satisfactorily weld the sheath portion and the sheath member, and can secure sufficient welding strength between them and also sufficient mechanical strength of the flange. Additionally, exemplary means for welding the sheath member to the sheath portion of the flange includes laser welding, plasma welding, electron beam welding or argon welding or the like.

DESCRIPTION OF REFERENCE NUMERALS

Figure 1:
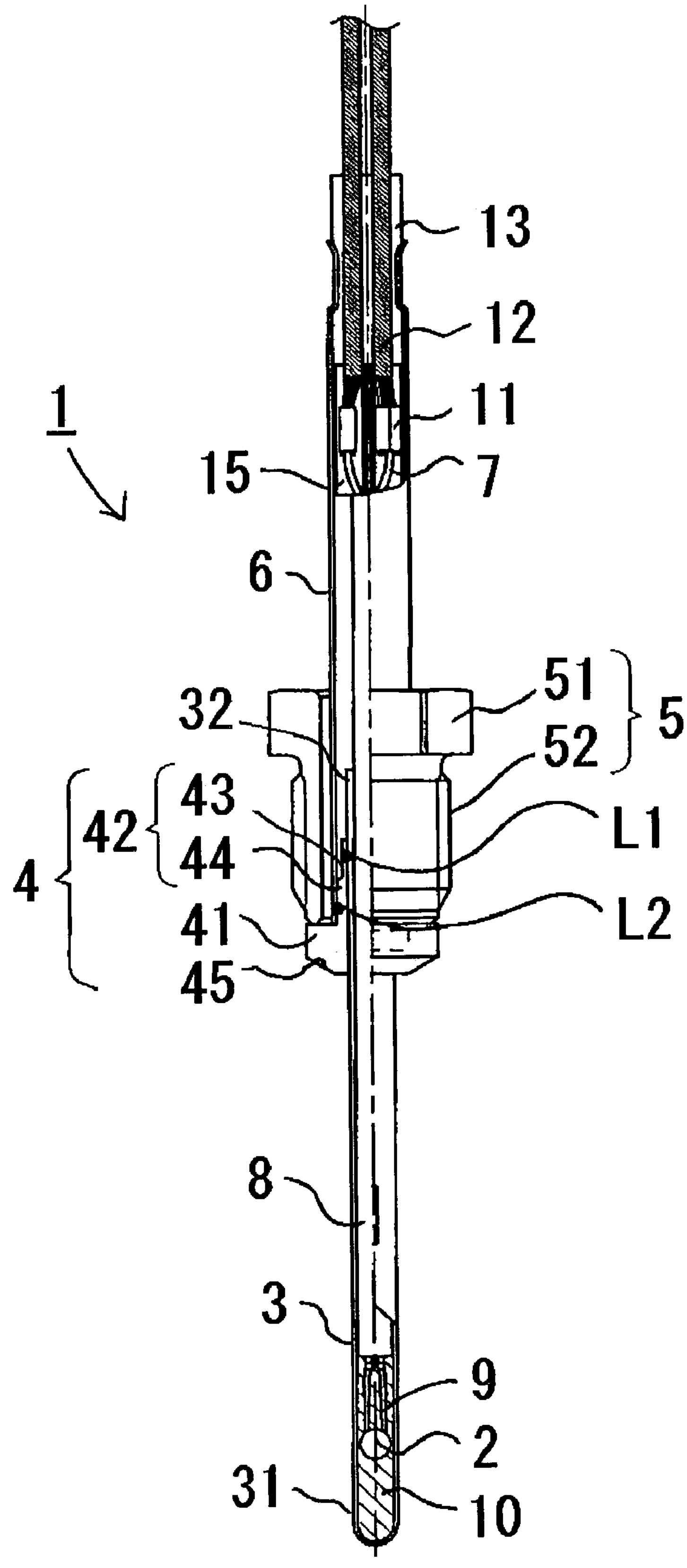
FIG. 1 is a partial exploded sectional view of a first embodiment of the invention showing a temperature sensor in which a metal tube for accommodating a thermistor device is pushed into a sheath portion of a flange and laser welding is applied to the sheath portion in a circumferential direction.

1, 100: temperature sensor
2: thermistor device
3: metal tube
4: flange
41: projection portion
42: sheath portion
43: rear end step portion
44: distal end step portion
6: joint
7: metal core wire
8: sheath member
12: lead wire
L1, L2, L3: weld portions

DETAILED DESCRIPTION OF THE PREFERRED EMBODIMENT

First Embodiment:

A temperature sensor 1 according to an embodiment of the invention will be explained with reference to the accompanying drawings. However, the present invention should not be construed as being limited thereto. FIG. 1 is a partial exploded sectional view showing the construction of the temperature sensor 1 according to the invention. This temperature sensor 1 employs a thermistor device 2 as a temperature-sensitive device. When the temperature sensor 1 is fitted to an exhaust pipe of an automobile, the thermistor device 2 is positioned inside the exhaust pipe in which an exhaust gas flows, and detects the temperature of the exhaust gas.

A metal tube 3 extending in an axial direction has a cylindrical shape a distal end side 31 of which is closed by deep drawing of a steel sheet. The thermistor device 2 is accommodated inside this distal end portion 31. The metal tube 3 is formed of a stainless alloy as will be later described. Cement 10 is filled around the thermistor device 2 inside the metal tube 3 to prevent rocking of the thermistor device 2 due to vibration during use. A rear end side 32 of the metal tube 3 is open and is fitted into a flange 4 formed of a stainless alloy.

The flange 4 includes a sheath portion 42 extending in the axial direction and a projection portion 41 positioned on the distal end side of the sheath portion 42 and protruding outward in a diametric direction. The projection portion 41 is shaped into an annular shape having a seat surface 45 that has a taper shape on its distal end side corresponding to a taper portion of a fitting portion of the exhaust pipe not shown in the drawing. When the seat surface 45 comes into close contact with the taper portion of the fitting portion, the exhaust gas is prevented from leaking out of the exhaust pipe. The sheath portion 42 is shaped into an annular shape, and has a two-step shape including a distal end step portion 44 on the distal end side and a rear end step portion 43 having a smaller outer diameter than that of the distal end step portion 44.

The metal tube 3 is inserted from its rear end side 32 into the distal end side of the projection portion 41 of the flange 4 and is pushed into the sheath portion 42. An overlapping portion of the outer peripheral surface of the metal tube 3 with the inner peripheral surface of the rear end step portion 43 of the sheath portion 42 is laser welded in a circumferential direction. When this laser welding is conducted, a weld portion (L1) bridging the rear end step portion 43 of the sheath portion 42 and the metal tube 3 is formed as shown in FIG. 1, and the metal tube 3 is firmly fixed to the flange 4.

Since laser welding is applied to the rear end step portion 43 of the sheath portion 42 while the metal tube 3 is pushed into the sheath portion 42 of the flange 4, the welding strength is high between the flange 4 and the metal tube 3, and the temperature sensor 1 has high adhesion strength between the flange 4 and the metal tube 3. Consequently, even when strong vibration acts on the temperature sensor 1 under a severe condition such as vibration of the automobile, the metal tube 3 hardly vibrates, its breakage can be suppressed and reliability of air tightness to the exhaust gas can be improved. Additionally, a method for securing high adhesion between the sheath portion 42 of the flange 4 and the metal tube 3 is not particularly limited to a method in which the metal tube 3 is pushed into the sheath portion 42, and it is also possible to employ a method that clamps inward the sheath portion (L2) and the metal tube 3 in the diametric direction, or to combine this method with the push-in method described above.

A nut 5 having a hexagonal nut portion 51 and a screw portion 52 is fitted round the flange 4 so as to be capable of rotating. The nut 5 fixes the temperature sensor 1 after the seat surface 45 of the projection portion 41 of the flange 4 is brought into contact with the fitting portion of the exhaust pipe. A cylindrical joint 6 is hermetically fitted to the outside of the distal end step portion 44 of the sheath portion 42 in the diametric direction inside the flange 4. More concretely, the joint 6 is pushed into the distal end step portion 44 of the sheath 42 such that the inner peripheral surface of the joint 6 overlaps with the outer peripheral surface of the distal end step portion 44. The joint 6 and the distal end step portion 44 are then laser-welded in the circumferential direction. When this laser welding is applied, a weld portion 42 bridging the distal end step portion 44 of the sheath portion 42 and the metal tube 3 is formed as shown in FIG. 1.

A sheath member 8 having a pair of metal core wires 7 is arranged inside each of the metal tube 3, the flange 4 and the joint 6. The thermistor device 2 is connected through Pt/Rh alloy wires 9 to the metal core wires 7 that protrude from the distal end side of the sheath member 8 inside the metal tube 3. The alloy wires 9 are fired simultaneously with the thermistor device 2. The alloy wires 9 and the metal core wires 7 are resistance welded to one another. Incidentally, the sheath member 8 includes a metal outer cylinder made of SUS310S, a pair of electrically conductive metal core wires 7 made of SUS310S and insulating powder that insulates the outer cylinder from the metal core wires 7 and holds the metal core wires 7, though the detail is not illustrated in the drawing.

The metal core wires 7 protruding towards the rear end side of the sheath member 8 inside the joint 6 are connected to a pair of lead wires 12 for connecting an external circuit (such as ECU of an automobile) through caulking terminals 11. An insulating tube 15 insulates the pair of metal core wires 7 from the pair of caulking terminals 11. An insulating material covers a conductor wire of a stainless alloy to provide each lead wire 12. The lead wires 12 are inserted into an auxiliary ring 13 formed of heat-resistant rubber provided to the rear end opening of the joint 6. When round caulking or polygonal caulking is applied to the auxiliary ring 13 from above the joint 6, both of these members 13 and 6 are bonded to each other while maintaining air tightness. Consequently, the thermistor device 2 is accommodated in the closed space defined by the metal tube 3, the flange 4 and the joint 6 as the metal enclosure members. The output of the thermistor device 2 is taken from the metal core wires 7 of the sheath member 8 through the lead wires 12 to an external circuit, not shown, and the temperature of the exhaust gas is detected.

When air enters from outside the joint 6 through the space inside the lead wires 12 in the temperature sensor 1 of this embodiment, this air also enters the metal tube 3, because the closed space is defined inside the joint 6, the metal tube 3 and the flange 4. Therefore, ventilation can be secured from inside the lead wires 12 to the inside of the metal tube 3 in this temperature sensor 1. Even when the metal tube 3 accommodating therein the thermistor device 2 is oxidized, the reduction in oxygen concentration inside the metal tube 3 can be suppressed, and the change of characteristics of the thermistor device 2 also can be suppressed.

Since this temperature sensor 1 is used in a high temperature environment reaching 1,000° C., each constituent member must have sufficient heat resistance. Therefore, each of the metal tube 3, the flange 4 and the metal core wire 7 is made of SUS310S as a heat-resistant alloy that contains Fe as its main component and contains also C, Si, Mn, P, S, Ni and Cr. The joint 6 is made of SUS304.

In the temperature sensor 1 of this embodiment described above, the metal tube 3 and the flange 4 are integrally bonded through laser welding. The weld portion (L1) by laser welding is formed at the sheath portion 42 of the flange 4 positioned on the rear end side but not at the projection portion 41 on the distal end side facing the inside of the exhaust pipe. Consequently, a heat transfer path extending from the heat-sensitive portion of the temperature sensor 1 (the portion from the seat surface 45 of the flange 4 toward the thermistor device 2) to the flange 4 through the weld portion is not formed inside the exhaust pipe, and the degree of heat transfer from the heat-sensitive portion to the flange 4 can be limited to a lower level than in the prior art sensors. It is thus possible to improve response, to prevent reduced temperature measuring accuracy, and to maintain reliability of the auxiliary ring 13 by suppressing an increase in the temperature of the joint 6.

Because the weld portion (L1) between the metal tube 3 and the flange 4 is not exposed inside the exhaust pipe, oxidation that is likely to occur on the inner surface of the weld portion can be effectively suppressed and eventually, the change of characteristics of the thermistor device 2 can be suppressed. On the other hand, reliability of air tightness to the exhaust gas can be improved.

Second Embodiment:

Next, a temperature sensor 100 according to another embodiment will be explained with reference to the drawings. However, the present invention should not be construed as being limited thereto. The temperature sensor 100 of this second embodiment is mainly different from the temperature sensor 1 of the first embodiment in the member for accommodating the thermistor device 2 and in the member to be laser-welded to the sheath portion of the flange. The rest of the construction is substantially the same. Therefore, explanation will be given primarily on the different portions but will be omitted or simplified on the similar portions.

Figure 2:
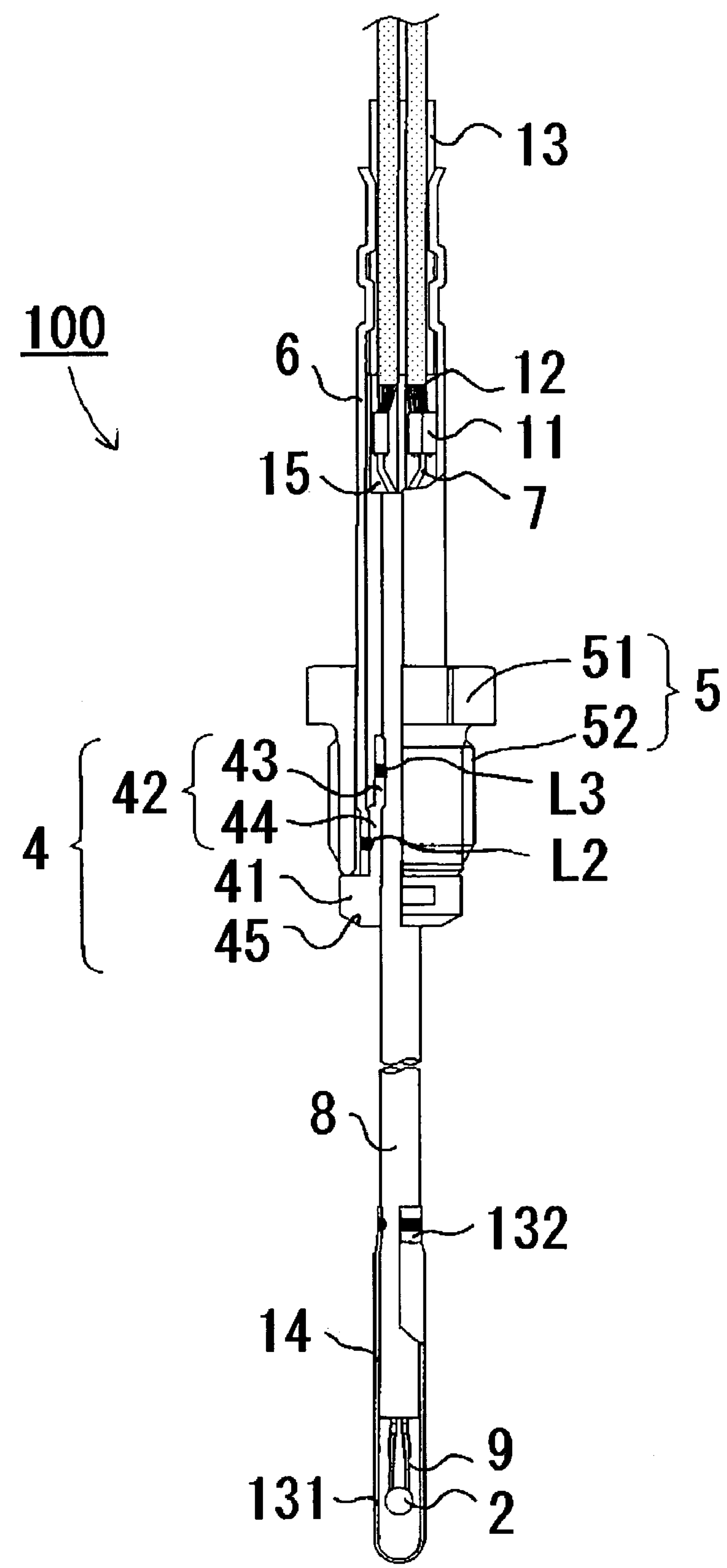
FIG. 2 is a partial exploded sectional view of a second embodiment of the invention showing a temperature sensor in which a sheath member having a metal cap for accommodating a thermistor device bonded thereto is clamped and fixed to a sheath portion of a flange and laser welding is applied to the sheath portion in a circumferential direction.

First, FIG. 2 is a partial exploded sectional view showing the construction of the temperature sensor 100. In the temperature sensor 1 of the embodiment described above, the thermistor device 2 is accommodated inside the metal tube 3 and the metal tube 3 is fixed to the flange 4 by laser welding (see FIG. 1). In contrast, in the temperature sensor 100 of this embodiment, the thermistor device 2 is accommodated inside a metal cap 14 and a sheath member 8 is laser welded and fixed to the flange 4 while the metal cap 14 is bonded to the sheath member 8.

The metal cap 14 extending in the axial direction has a cylindrical shape the distal end 131 of which is closed. The thermistor device 2 is accommodated inside this distal end side 131. The metal cap 14 is formed of a stainless alloy such as SUS310S. The thermistor device 2 is connected to metal core wires 7 protruding from the distal end side of a sheath member 8 through its electrode wires (Pt/Rh alloy wires) 9. The rear end side 132 of the metal cap 14 is released. The rear end side 132 is laser welded to the sheath member 8 in the circumferential direction while the inner peripheral surface of the rear end side 132 overlaps with the outer peripheral surface of the sheath member 8 (the outer cylinder of the sheath member 8 in further detail) incorporating a pair of metal core wires 7. The metal cap 14 is thus fixed to the sheath member 8.

As described above, the flange 4 includes the sheath portion 42 extending in the axial direction and the projection portion 41 positioned on the distal end side of the sheath portion 42 and protruding outward in the diametric direction. The sheath portion 42 has a two-step shape including the distal end step portion 44 positioned on the distal end side and the rear end step portion 43 having a smaller outer diameter than that of the distal end step portion 44.

The sheath member 8 is clamped inward in the diametric direction at a predetermined position of the outer peripheral surface of the sheath portion 42 while its rear end side is fitted into the flange 4 and is fixed to the flange 4. The overlapping portion of the outer peripheral surface of the sheath member 8 with the inner peripheral surface of the rear end step portion 43 of the sheath portion 42 is laser welded in the circumferential direction. Since this laser welding is applied, a weld portion (L3) bridging the rear end step portion 43 of the sheath portion 42 and the sheath member 8 (outer cylinder of the sheath member 8 in more detail) is formed as shown in FIG. 2, and the sheath member 8 is firmly fixed to the flange 4.

As described above, the sheath member 8 is clamped and fixed to the sheath portion 42 of the flange 4 and in this state, laser welding is applied to the rear end step portion 43 of the sheath portion 42. Consequently, the temperature sensor 100 has high welding strength between the flange 4 and the sheath member 8 and high bonding strength between the flange 4 and the sheath member 8. Therefore, even when the temperature sensor 100 is subjected to strong vibration in the vigorous vibration environment of an automobile, the sheath member 8 hardly vibrates and breakage of the sheath member 8 can be suppressed. Reliability of air tightness to the exhaust gas can also be improved.

As explained above, in the temperature sensor 100 of the second embodiment, the sheath member 8 and the flange 4 are integrally bonded to each other by laser welding. The weld portion (L3) formed by laser welding is formed at the sheath portion 42 positioned on the rear end side of the flange 4 but not at the projection portion 41 on the distal end side facing the inside of the exhaust pipe. Therefore, a heat transfer path extending from the heat-sensitive portion of the temperature sensor 100 (the portion from the seat surface 45 of the flange 4 toward the thermistor device 2) to the flange 4 through the weld portion is not formed inside the exhaust pipe, and the degree of heat transfer from the heat-sensitive portion to the flange 4 can be limited to a lower level than in the prior art sensors. It is thus possible to improve response, to prevent a reduction in temperature measuring accuracy, and to maintain reliability of the auxiliary ring 13 by suppressing the increase in temperature of the joint 6. Because the weld portion (L3) between the sheath member 8 and the flange 4 is not exposed inside the exhaust pipe, reliability of air tightness to the exhaust gas can be improved.

The invention is not particularly limited to the embodiments described above but may be changed or modified in various ways within the scope of the invention and in accordance with the intended object and application. For example, in the temperature sensor 1 of the embodiment described above, response of the temperature sensor can be improved when the thickness of the distal end is rendered smaller than that of the other portions.

It is further possible to employ a construction in which a cylindrical portion having an outer diameter smaller than that of the projection portion 41 and an inner diameter greater than that of the outer diameter of the metal tube 3 or the sheath member 8 is integrally formed on the more distal end side from the projection portion 41 of the flange 4, and the outer peripheral surface of this cylindrical portion is clamped inward in the diametric direction so as to clamp and fix the cylindrical portion to the metal tube 3 or to the sheath member 8. In this way, a temperature sensor in which the metal tube 3 or the sheath member 8 are not subject to breakage and which has higher vibration resistance can be achieved. The temperature sensor of the invention can be applied not only to an exhaust gas temperature sensor but also to a temperature sensor fitted to a flow passage through which a liquid such as water or oil as a fluid to be measured flows.

This application is based on Japanese Patent Application No. 2001-153242 filed May 22, 2001, the disclosure of which is incorporated herein by reference in its entirety.

What is claimed is:

1. A temperature sensor including:

a cylindrical metal tube having a distal end thereof closed and extending in an axial direction;

a device accommodated in said metal tube and having electric characteristics thereof changing in accordance with temperature; and a flange encompassing an outer peripheral surface of said metal tube;

wherein said flange includes a sheath portion extending in the axial direction and a projection portion positioned on a distal end side of said sheath portion and protruding outward in a diametric direction, said projection portion having a seat surface at a distal end thereof, said metal tube is pushed into, or clamped and fixed to, at least said sheath portion, and said metal tube and said sheath portion are welded in a circumferential direction rearward of said seat surface;

said temperature sensor further including a sheath member having built-in metal core wires having said device connected to a distal end side thereof and lead wires for connecting an external circuit, connected to a rear end side thereof, and a cylindrical joint bonded air-tight outside said sheath portion of said flange in the diametric direction and extending rearward in the axial direction, wherein the distal end side of said sheath member is inserted into said metal tube, and the rear end side of said metal tube and the distal end side of said lead wires are arranged inside said joint; and wherein said sheath portion has a two-step shape including a distal end step portion positioned on a distal end side and a rear end step portion having an outer diameter smaller than that of said distal end step portion, said metal tube is welded to said rear end step portion of said sheath portion and said joint is bonded to an outer peripheral surface of said distal end step portion in a circumferential direction.

2. A temperature sensor including:

a sheath member including built-in metal core wires having a device connected to a distal end side thereof, said device having electric characteristics changing in accordance with temperature, and lead wires for connecting an external circuit, connected to a rear end side thereof, a cylindrical metal cap having a distal end thereof closed, extending in an axial direction and having an inner periphery on the rear end side thereof bonded to an outer periphery on the distal end side of said sheath member in a circumferential direction while accommodating therein said device; and a flange encompassing the outer periphery of said sheath member;

wherein said flange includes a sheath portion extending in the axial direction and a projection portion positioned on the distal end side of said sheath portion and protruding outward in a diametric direction, said projection portion having a seat surface at a distal end thereof, said sheath member is pushed into, or clamped and fixed to, at least said sheath portion, and said sheath member and said sheath portion are welded in a circumferential direction rearward of said seat surface and, wherein said sheath portion not including the projection portion has a two-step shape including a distal end step portion positioned on a distal end side and a rear end step portion having an outer diameter smaller than that of said distal end step portion, and said sheath member is welded to said rear end step portion of said sheath portion, and wherein said sheath portion has an outer diameter smaller than that of the projection portion.

3. A temperature sensor, adapted for measuring the temperature of a gas flowing inside a gas passage, said gas passage having a fitting portion for receiving said temperature sensor, said temperature sensor including:

a cylindrical metal tube having a distal end thereof closed and extending in an axial direction;

a device accommodated in said metal tube and having electric characteristics thereof changing in accordance with temperature; and a flange encompassing an outer peripheral surface of said metal tube;

wherein said flange includes a sheath portion extending in the axial direction and a projection portion positioned on a distal end side of said sheath portion and protruding outward in a diametric direction, said projection portion including a seat surface for mating with the fitting portion of the gas passage, said metal tube is pushed into, or clamped and fixed to, at least said sheath portion, said metal tube and said sheath portion are welded in a circumferential direction, and said flange is configured such that the welded portion is not exposed to gas flowing inside the gas passage when said temperature sensor is positioned in the fitting portion of the gas passage; said temperature sensor further including a sheath member having built-in metal core wires having said device connected to a distal end side thereof and lead wires for connecting an internal circuit, connected to a rear end side thereof, and wherein said sheath portion has a two-step shape including a distal end step portion positioned on a distal end side in a rear end step portion having an outer diameter smaller than that of the distal end step portion, and said sheath member is welded to said rear end step portion of said sheath portion.

4. The temperature sensor as claimed in claim 3, wherein said seat surface is positioned at the most distal end of the projection portion.

5. The temperature sensor as claimed in claim 3, wherein when said temperature sensor is positioned in the fitting portion of the gas passage, the welded portion is outside the gas passage.

6. The temperature sensor as claimed in claim 1, wherein no welds are present at or forward of the seat surface.

7. The temperature sensor as claimed in claim 1, wherein said distal end step portion and rear end step portion are arranged rearward of said projection portion.

8. The temperature sensor as claimed in claim 2, wherein said distal end step portion and rear end step portion are arranged rearward of said projection portion.

9. The temperature sensor as claimed in claim 3, wherein said distal end step portion and rear end step portion are arranged rearward of said projection portion.

10. A temperature sensor including:

a sheath member including built-in metal core wires having a device connected to a distal end side thereof, said device having electric characteristics changing in accordance with temperature, and lead wires for connecting an external circuit, connected to a rear end side thereof, a cylindrical metal cap having a distal end thereof closed, extending in an axial direction and having an inner periphery on the rear end side thereof bonded to an outer periphery on the distal end side of said sheath member in a circumferential direction while accommodating therein said device; and a flange encompassing the outer periphery of said sheath member;

wherein said flange includes a sheath portion extending in the axial direction and a projection portion positioned on the distal end side of said sheath portion and protruding outward in a diametric direction, said projection portion having a seat surface at a distal end thereof, said sheath member is pushed into, or clamped and fixed to, at least said sheath portion, and said sheath member and said sheath portion are welded in a circumferential direction rearward of said seat surface and, wherein said sheath portion has a two-step shape including a distal end step portion positioned on a distal end side and a rear end step portion having an outer diameter smaller than that of said distal end step portion, and said sheath member is welded to said rear end step portion of said sheath portion, and wherein the projection portion has an upper surface arranged opposite the seat surface at a rear end thereof, and said distal end step portion and rear end step portion of said sheath portion are arranged above the upper surface of said projection portion.

* * * * *